UNITED STATES PATENT OFFICE.

GEORGE J. OLNEY, OF WESTERNVILLE, NEW YORK.

MEASURING DEVICE.

1,388,192.  Specification of Letters Patent.  Patented Aug. 23, 1921.

Application filed December 6, 1920. Serial No. 428,751.

*To all whom it may concern:*

Be it known that I, GEORGE J. OLNEY, a citizen of the United States, and a resident of Westernville, in the county of Oneida and State of New York, have invented certain new and useful Improvements in Measuring Devices; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to measuring devices used to supply a desired quantity of liquid to successively presented pockets or receptacles with means provided in the device for the air in said pockets or receptacles to escape without interfering with or varying the supply of liquid.

The purpose of my invention is to provide a novel device of the character described which is simple and durable in construction and efficient and reliable in operation.

A further purpose is to provide a supply chamber near the measuring valve which supply chamber is gradually filled from a larger source of supply and is adapted to discharge its contents quickly when the measuring valve is temporarily brought into connection therewith.

A further purpose is to provide a by-pass for the air in the pockets to escape through instead of its having to rise through the measuring valve.

A further purpose is to so arrange the supply chamber and the pipe for filling the same that any air that may rise through the measuring valve will rise to the top of the supply chamber instead of going up through the pipe that supplies said chamber; and further to provide a means for the said air accumulating in the top of the said supply chamber to escape and to lead said escaping air to the top of the main supply tank so that any liquid carried along with this air will be saved.

Figure 1:
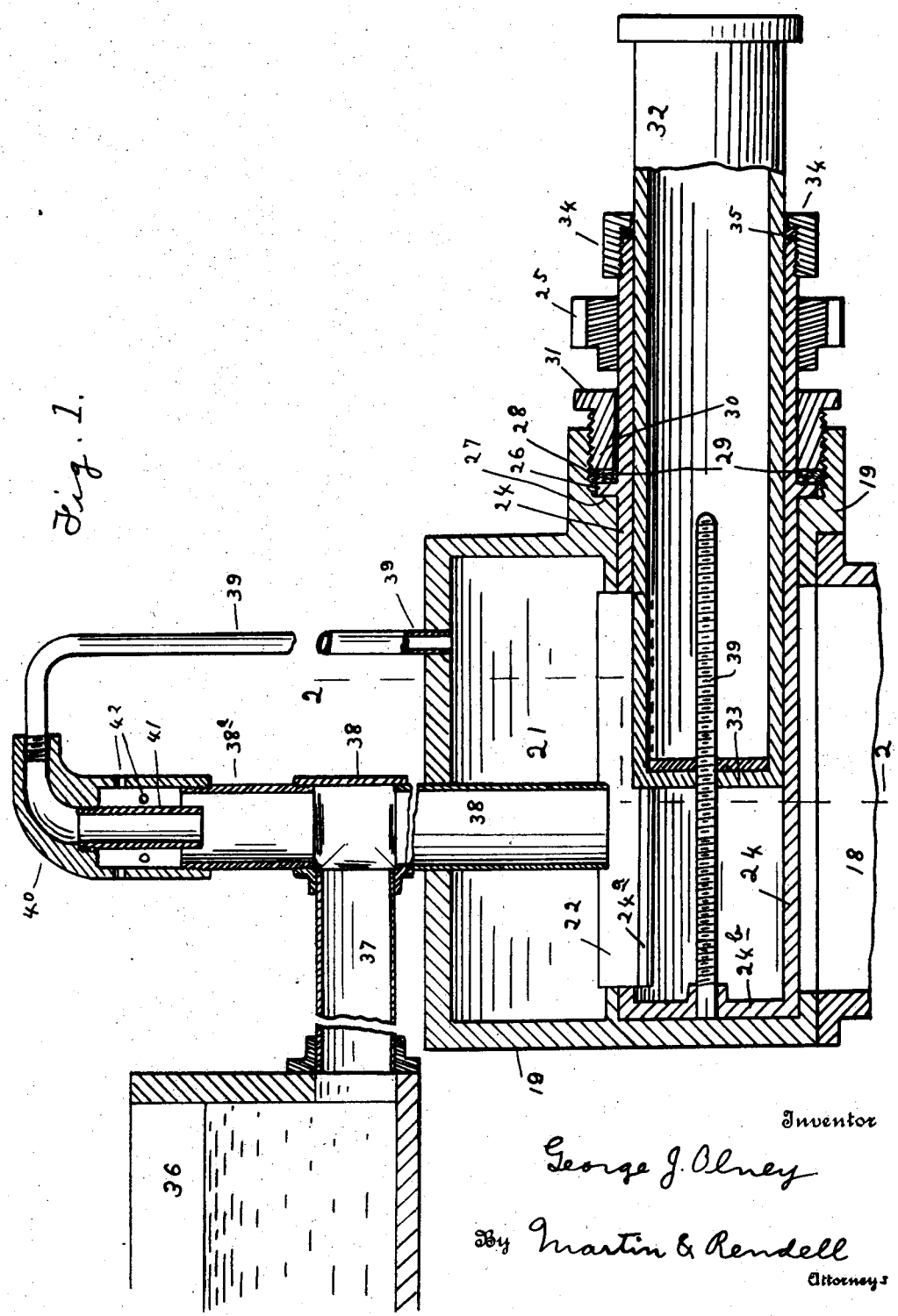
Figure 1 is a longitudinal vertical sectional view of a measuring device embodying my invention.

It will be seen that my liquid measuring device proper is shown in connection with a main device for measuring and mixing solids or semi-solids such as corn and beans for canning. While my liquid measuring device is particularly adapted for use in connection with such a main mixing and measuring device and I have claimed such a combination, it will be plain that my liquid measuring device proper is not limited in its use to that machine but may be used in a number of places where it is desired to supply a given amount of liquid to a receptacle from which the air should be allowed to escape without interfering with the supply or measuring of said liquid.

Referring to the drawing in a more particular description, it will be seen that the main solid or semi-solid measuring and mixing device consists of a hollow cylindrical body 10 in which is rotatably mounted the revolving member 11 having wings 12 forming the pockets 13 between adjacent wings 12. As the member 11 revolves the upper pocket is filled with solid or semi-solid material from the hopper 14 above the body 10 and further rotation of the pocketed member carries this supply around until the pockets open downwardly and discharge their supply by gravity into the mixing chamber 16 below, through which extends the worm 17 for transporting and further mixing the material.

Figure 2:
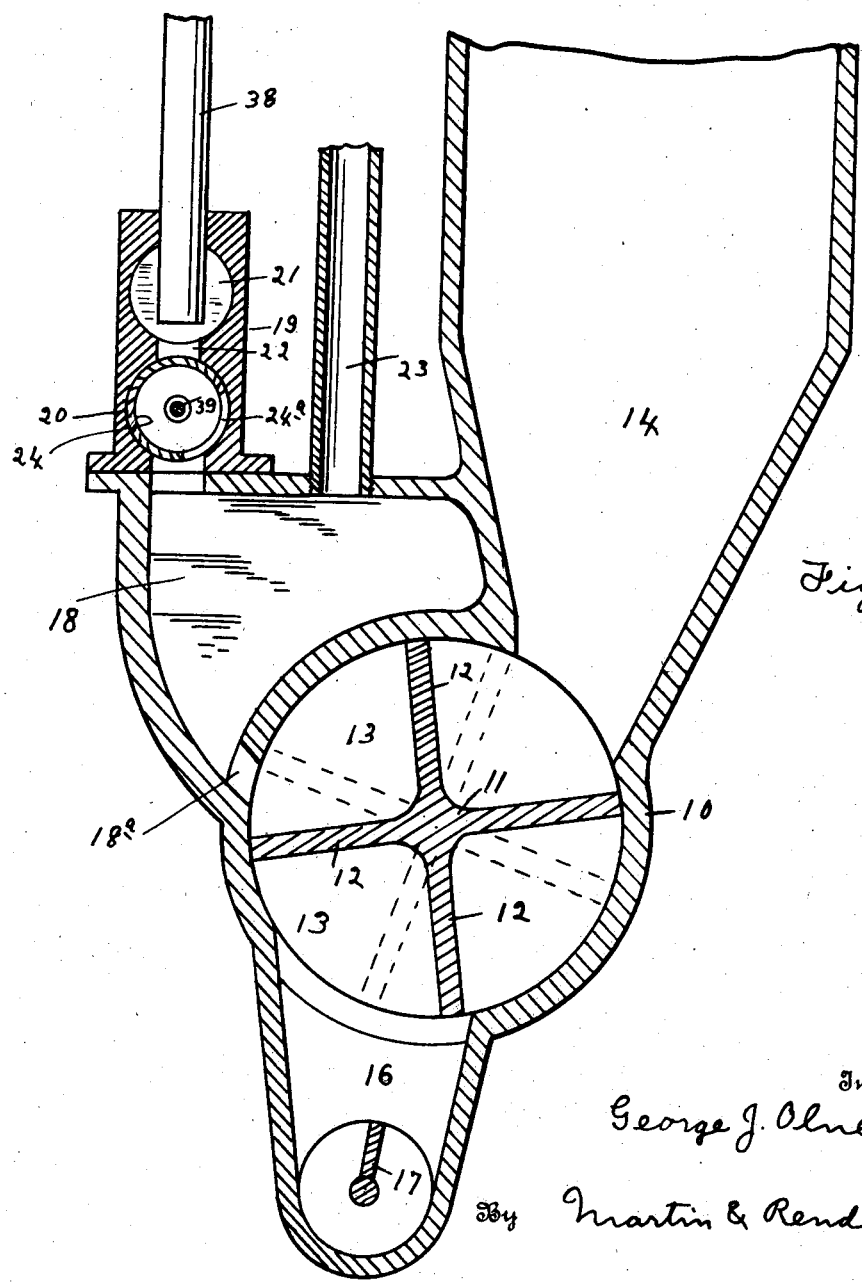
Fig. 2 is a transverse vertical sectional view of the device shown in Fig. 1 on line 2—2 of Fig. 1 (but with the valve 24 in a different position) together with a main mixing device to use with which my measuring device is particularly adapted.

To each successive pocket 13 it is desired to conduct a supply of liquid called syrup in the case of canned vegetables. Preferably this liquid is conducted to each successive pocket before the solid or semi-solid matter is fed to that pocket. One reason for this is to flood the pocket with liquid so that the solid material will not stick to the main measuring member 11 or its wings 12. Accordingly I have shown the passage 18 for conducting the liquid from the liquid-measuring device proper as leading into the body 10 to the left of the hopper 14 as the parts are shown in Fig. 2, it being understood that the pocketed member revolves clockwise.

The liquid measuring casing 19 has a cylindrical measuring chamber 20 which opens into the passage 18 above mentioned as leading to the pocketed member. In the casing 19 is also the supply chamber 21 directly above the measuring chamber and communicating therewith through a large opening 22. Provided beside the casing 19 is the main air escape or by-pass 23 leading from the passage 18 upwardly and to the atmosphere at a point preferably above the supply chamber 21.

Revolubly mounted in the measuring chamber 20 so as to make one revolution to each pocket presented in the body 10 is the measuring valve 24. This measuring valve consists of a hollow cylinder open at its right-hand end as shown in Fig. 1 for a purpose to be presently described. This valve extends out through an opening in the right-hand end of the casing as shown in Fig. 1 and to its extended exposed end or part is fixed a toothed ring 25 whereby the valve may be rotated by connecting gears at the desired speed and at the proper time relative to the pockets 13.

An outwardly extending ring 26 on the valve 24 fits against the shoulder 27 at the bottom of an annular recess 28 in the said right end of the casing 19. Outside said ring 26 is an annular packing 29 against which bears the flange 30 on a ring 31 preferably screw-threaded to the adjacent end of casing 19. In this way the valve is rendered liquid-tight but is allowed to freely rotate in the casing and obviously may be readily removed and replaced. The valve has a large opening $24^a$ along one side corresponding substantially in extent with the opening 22 in the casing leading from the supply chamber 21.

In order to close the open end of the hollow cylindrical measuring valve 24 there is slidingly and rotatably mounted therein a further hollow cylindrical member or plunger 32 having a closed end 33 at its left-hand end as the parts are seen in Fig. 1. This plunger is adjusted longitudinally of and within the valve 24 in order to vary as desired the actual cubical contents of the valve 24. Such adjustment is accomplished by providing a screw-threaded rod 39 having one end non-rotatably secured to the left-hand end $24^b$ of the valve 24 with the body of said rod in screw-threaded engagement with the bottom 33 of said plunger 32. The plunger normally stays where adjusted and rotates with the valve. Adjustment is made by running the plunger in or out by rotating it the proper way relatively to the valve. This may be so adjusted even when the valve is in operation by grasping the knurled flanged extreme outer end of the plunger 32.

A flanged ring 34 is screw-threaded to the extreme outer end of the valve so as to hold a packing 35 against the plunger and form a liquid-tight joint at that point.

A main supply tank 36 is located above the supply chamber 21 and a pipe 37 of adequate size leads from said tank to another pipe 38 which extends down through the casing 19 and through the supply chamber 21 to a point quite close to the bottom of said chamber.

An air escape pipe 39 leads from the upper portion of the said supply chamber 21 upward to a point above the level of the liquid in the main supply tank 36 and then has its end turned over into an elbow 40 the downwardly extending end of which is secured to the upstanding extension $38^a$ of pipe 38. There is provided a downturned pipe 41 inside the elbow extending down a short distance into the pipe $38^a$. Openings 42 are provided in the vertical portion of the elbow 40 for the escape of air coming through pipes 39 and 41 so that any liquid that may be drawn up by such escaping air will be again placed in the supply pipe 38.

The revolving measuring valve 24 will be connected to the pocketed revolving member 11 as by intermediate gears or the equivalent (not shown) so that said measuring valve will make one complete operative motion as each pocket 13 is presented. The connection further will be such that the measuring valve will discharge its supply of liquid as the last part of a pocket 13 is brought opposite the port $18^a$ of passage 18 which is about the relative position of the parts as shown in Fig. 2. At this position of the parts the imperforate part of valve 24 is adjacent the opening 22 which connects the supply chamber 21 and the measuring chamber 20. At such time the liquid from the main source of supply such as the main supply tank 36 will be flowing down as by gravity through the pipes 37 and 38 into the supply chamber 21 and gradually filling that chamber. Upon further rotation of the measuring valve 24 its opening $24^a$ will be brought to an upward position or registering with the opening 22 whereupon the liquid or other material in the supply chamber 21 will by gravity descend into and fill the available space in the revolving valve 24. During this filling operation of course the material may descend through the pipes 37 and 38 but most of the material will be supplied from the supply chamber 21, the outlet from which is much larger than the outlet from pipe 38. Further rotation of the valve 24 will again close the opening 22 whereupon the liquid will continue to descend through pipe 38 and again fill the supply chamber 21. The supply of liquid in the valve is held until the opening of the valve is downward when the liquid will be free to drop through the passage 18 into the pocket 13. As this charge of liquid descends into the pocket a corresponding amount of air will rise through the port $18^a$ and passage 18. Most of this air, however, will rise through the main air escape passage or by-pass 23 leading from the passage 18 to a point preferably above the supply chamber 21. Some air, however, will enter the revolving valve and rise when the valve is again turned to upward position. This air will then escape into the supply chamber 21 to the top of which it will rise from which position it will escape through the air escape pipe 39. If in the filling of the supply chamber 21 any liquid has ascended into the pipe 39 or if any liquid is carried up with the ascending air such liquid will be thrown out from the top of the pipe 39 into the extension 38ª of main supply pipe 38 while the air will escape into the atmosphere through holes 42.

The air that has found its way into the measuring valve will rise into the supply chamber 21 rather than up through the pipe 38 because of the opening in the supply tank being larger than the opening into the pipe 38, aided by the further fact that the column of liquid in the pipe 38 is higher and less disturbed than is the supply of liquid in the supply chamber 21.

What I claim is:

1. In a measuring device the combination of a casing having a cylindrical measuring chamber, a supply chamber thereabove, a large opening leading from the supply chamber to the measuring chamber, a passage leading from the bottom of the measuring chamber, a main air escape leading from the said passage, a hollow cylindrical measuring valve revolubly mounted in the measuring chamber and having an opening in its side adapted to register alternately with the opening in the bottom of the supply chamber and with the passage from the measuring chamber, a supply tank above the supply chamber, a supply pipe leading therefrom nearly to the bottom of the supply chamber and an air escape pipe leading from the upper part of the supply chamber to the atmosphere about the level of the liquid in the supply tank and adapted to return liquid carried along with said air to the supply of liquid.

2. In a measuring device the combination of a casing having a cylindrical measuring chamber, a supply chamber thereabove, a large opening leading from the supply chamber to the measuring chamber, a passage leading from the bottom of the measuring chamber, a main air escape leading from said passage, a hollow cylindrical measuring valve revolubly mounted in the measuring chamber and having an opening in its side adapted to register alternately with the opening in the bottom of the supply chamber and with the passage from the measuring chamber, means movably mounted in the measuring valve to vary the capacity thereof, a supply tank above the supply chamber, a supply pipe leading therefrom nearly to the bottom of the supply chamber and an air escape pipe leading from the upper part of the supply chamber to the atmosphere above the level of the liquid in the supply tank and adapted to return liquid carried along with said air to the supply of liquid.

3. In a measuring device the combination of a casing having a cylindrical measuring chamber, a supply chamber thereabove, a large opening leading from the supply chamber to the measuring chamber, a passage leading from the bottom of the measuring chamber, a main air escape leading from the said passage, a hollow cylindrical measuring chamber and having an opening in its side adapted to register alternately with the opening in the bottom of the supply chamber and with the passage from the measuring chamber, means slidingly mounted with a screw-threaded adjustment in the measuring valve to vary the capacity thereof, a supply tank above the supply chamber, a supply pipe leading therefrom nearly to the bottom of the supply chamber and an air escape pipe leading from the upper part of the supply chamber to the atmosphere above the level of the liquid in the supply tank and adapted to return liquid carried along with said air to the supply of liquid.

4. In a measuring and mixing device the combination, with a hollow body and a pocketed member movably mounted therein to receive material, of a casing having a cylindrical measuring chamber, a supply chamber thereabove, a large opening leading from the supply chamber to the measuring chamber, a passage leading from the bottom of the measuring chamber to the successively presented pockets of the body, and a main air escape leading from the said passage to the atmosphere, a hollow cylindrical measuring valve revolubly mounted in the measuring chamber and having an opening in its side adapted to register alternately with the opening in the bottom of the supply chamber and with the passage from the measuring chamber, a supply tank above the supply chamber, a supply pipe leading therefrom nearly to the bottom of the supply chamber and an air escape pipe leading from the upper part of the supply chamber to the atmosphere above the level of the liquid in the supply tank and adapted to return liquid carried along with said air to the supply of liquid.

In witness whereof I have affixed my signature this 23rd day of November, 1920.

GEORGE J. OLNEY.